United States Patent [19]
Kohn

[11] Patent Number: 4,776,600
[45] Date of Patent: Oct. 11, 1988

[54] DIELECTRIC PIPE FLANGE GASKET

[75] Inventor: Gary A. Kohn, Dallas, Tex.

[73] Assignee: Pikotek, Inc., Lakewood, Colo.

[21] Appl. No.: 123,907

[22] Filed: Nov. 23, 1987

[51] Int. Cl.⁴ .................. F16J 15/12; F16L 58/00
[52] U.S. Cl. ................................... 277/101; 277/171;
    277/180; 277/901; 285/48; 285/336
[58] Field of Search ............... 277/101, 167.3, 170,
    277/171, 180, 901; 285/328, 336, 351, 352, 355,
        363, 412, 423, 907, 923, 47, 48, 50

[56] References Cited

U.S. PATENT DOCUMENTS

| | | | |
|---|---|---|---|
| 969,423 | 9/1910 | Tanner et al. | 285/412 X |
| 1,527,535 | 2/1925 | Bockwitz | 277/170 |
| 2,407,076 | 9/1946 | Harkness | 285/351 X |
| 2,752,579 | 6/1956 | Caldwell et al. | 277/901 X |
| 2,860,311 | 11/1958 | Balian | 285/336 X |
| 3,575,431 | 4/1971 | Bryant | 277/171 |
| 4,406,467 | 9/1983 | Burger et al. | 277/901 X |

Primary Examiner—Robert S. Ward

[57] ABSTRACT

This invention discloses a dielectric pipe flange gasket having the dual functions of providing a leak proof seal for the pipe flange joint and an electrically insulating barrier between flanges, which dielectric pipe flange gasket comprises a planar annular disc member of corrosion resisting metal sandwiched between two hard dielectric planar members respectively bonded to two faces thereof and a pair of ring seals made of dielectric elastomer respectively disposed in two annular seal grooves respectively included in two faces of the pipe flange gasket, wherein the depth of the grooves partially extend into the metallic planar annular disc member.

9 Claims, 1 Drawing Sheet

U.S. Patent
Oct. 11, 1988
4,776,600
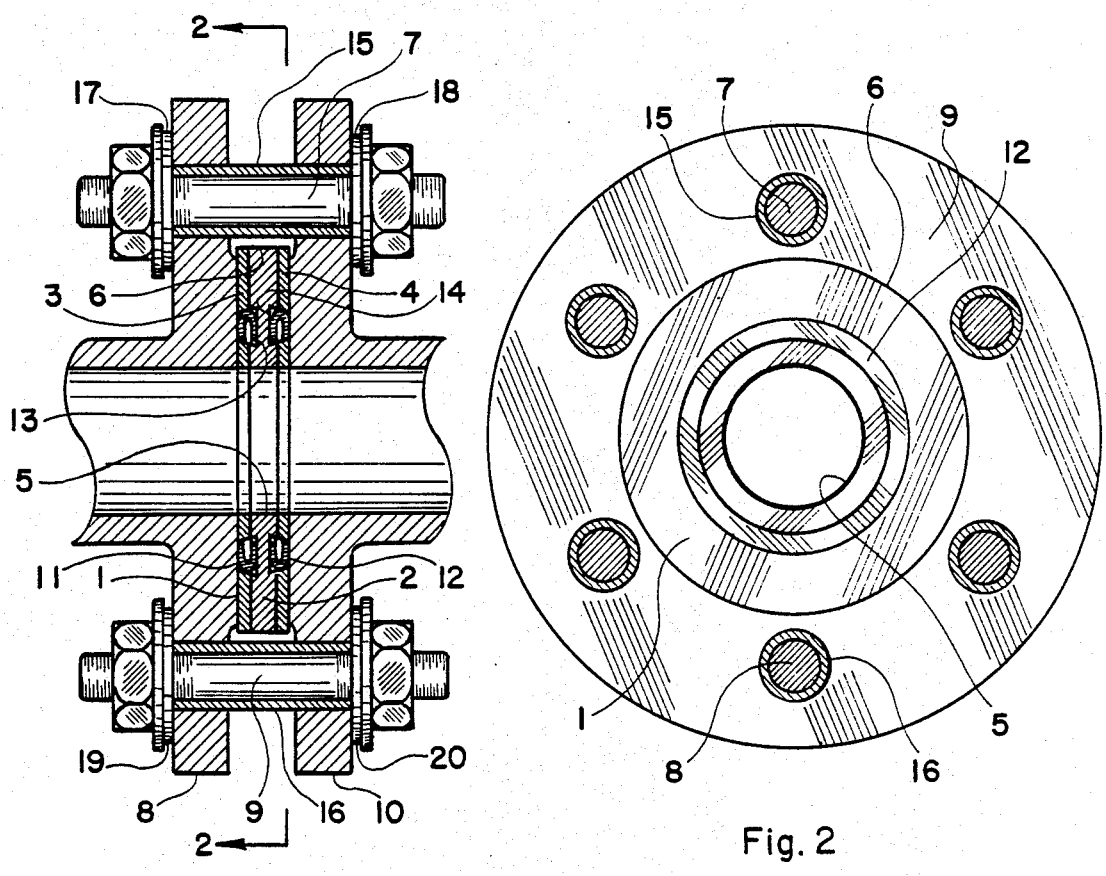
Fig. 1
Fig. 2
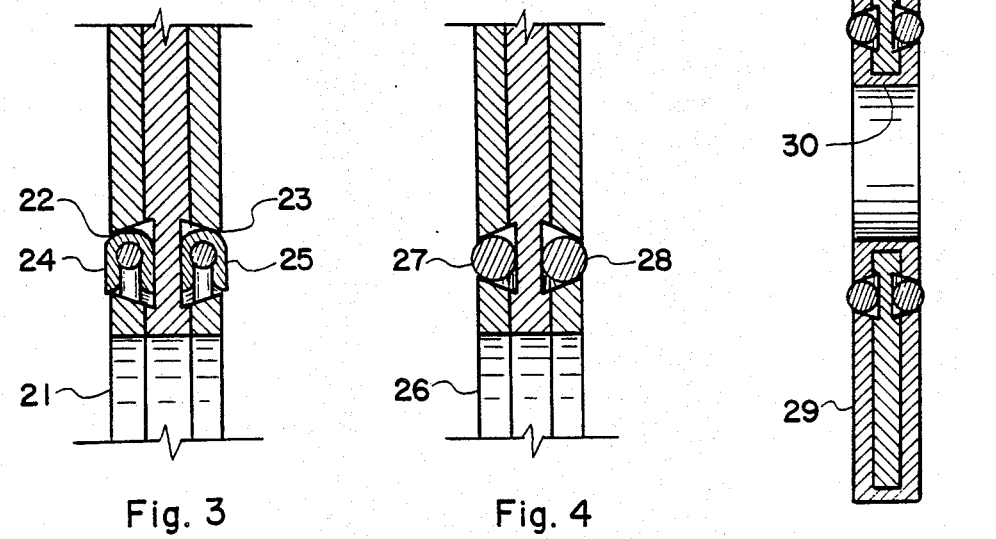
Fig. 3
Fig. 4
Fig. 5

DIELECTRIC PIPE FLANGE GASKET

BACKGROUND OF THE INVENTION

In today's industrialized world, oil, gas and water pipe lines criss-cross over every part and every corner of the earth. These pipe lines represent a huge amount of capital investment, as the cost of the pipes and the expense of their installation add up to millions of millions of dollars. The single most common problem with these pipe lines is the leak at the joints between pipe sections. As the pipe lines are often stretched across remote areas of poor accessibility, leaks of pipe joints are very expensive failures in view that it takes a great deal of time and resources to detect and repair the leaks. The primary cause of pipe joint failure arises from the failure of the gasket or corrosion of the pipe flanges. Therefore, in order to protect the large amount of investment in the pipe lines, it is imperative to use premium quality pipe flange gaskets, which provide leak proof seals almost indefinitely and protect the pipe flanges from corrosion caused by the ground electric currents and by the galvanic electric currents flowing across the pipe flange joints.

In the present day pipe line industry, there are many different types of dielectric pipe flange gaskets in the market. With few exceptions, these existing dielectric pipe flange gaskets use soft dielectric materials either alone or lining a metallic annular disc. The soft dielectric materials can be over-compressed by over-torqueing the tie rods joining the pipe flanges during installation of the pipe flange joints, which over-compression creates plastic flow of the soft dielectric materials and damages the ring type seals confined in the seal grooves by squeezing action and, consequently, results in leak at the flange joint. There are existing dielectric pipe flange gaskets made of single dielectric plate of high modulus of elesticity. Those pipe flange gaskets made of high modulus/hard dielectric materials are susceptible to wicking of contained media in the pipe through the gasket. These gaskets can be cracked by over-torqueing, yet require high bolt torques to establish the leak proof flange joints. Further, because the insulating capabilities of the dielectric gaskets are a direct function of gasket thickness, these use a single dielectric plate of significant thickness, which is vulnerable to blowout and leakage. As temperatures and pressure increase, thinner is better for gasket function and reliability. However, thicker is better for insulating characteristics. This dichotomy is satisfied by the design and function of the laminated design employed in the present invention.

BRIEF SUMMARY OF THE INVENTION

The primary object of the present invention is to provide a dielectric pipe flange gasket of laminated construction wherein a corrosion resistant metallic planar member of annular shape includes hard dielectric material laminates permanently bonded to the two faces of the metallic planar member.

Another object is to provide a dielectric pipe flange gasket including a pair of ring seals disposed in two seal grooves respectively included in the two faces of the pipe flange gasket wherein the seal grooves partially penetrating into the metallic planar member have cross section of a dove tail shape.

A further object is to provide a dielectric pipe flange gasket of laminated construction wherein the internal and external cylindrical surfaces of the gasket are lined with a corrosion resistant material.

BRIEF DESCRIPTION OF THE FIGURES

FIG. 1 illustrates an embodiment of the present invention installed intermediate two pipe flanges coupled to one another.

FIG. 2 illustrates a cross section of the embodiment shown in FIG. 1 taken along plane 2—2 as shown in FIG. 1.

FIG. 3 illustrates spring loaded ring seals disposed in seal grooves having cross section of a dove tail shape, which combination is included in the embodiment of the gasket shown in FIGS. 1 and 2.

FIG. 4 illustrates O-ring seals disposed in seal grooves having cross section of a dove tail shape, which combination may be included in the embodiment shown in FIGS. 1 and 2 in place of the spring loaded ring seals.

FIG. 5 illustrates another embodiment of the present invention that is a modified version of the embodiment shown in FIGS. 1-4.

DESCRIPTION OF THE ILLUSTRATED EMBODIMENTS

In FIG. 1 there is illustrated a cross section of an embodiment of the present invention, that is installed intermediate two pipe flanges joined to one another, which cross section is taken along a plane including the central axis of the pipes. The dielectric pipe flange gasket 1 of the present invention comprises a corrosion resisting metallic annular disc 2 including two high elastic modulus glass reinforced exoxy laminates 3 and 4 respectively bonded to the two faces thereof. The inside diameter 5 of the gasket 1 is generally matched to the inside diameter of the pipes, while the outside diameter 6 fits into a circular zone bounded by the tie rods or bolts 7, 8, etc. joining the two pipe flanges 9 and 10 in a mutually compressing arrangement, wherein the dielectric gasket 1 is compressed by the two pipe flanges 9 and 10. The dieldctric gasket 1 includes two ring seals 11 and 12 disposed in two seal grooves 13 and 14 respectively included in the two faces of the dielectric gasket 1 in a mirror image to one another. The cross section of the seal groove has the shape of a dove tail wherein the opening of the seal groove is narrower than the bottom thereof. The depth of the seal groove is slightly greater than the thickness of the dielectric lining, wherein the bottom of the seal groove has metallic surface provided by the metallic disc 2. The ring seals disposed in the seal grooves are face sealing lip seals such as a simple U-cup seals shown in FIG. 1 or spring loaded U-cup seals shown in FIG. 3, or may be O-ring seals shown in FIG. 4. The tie rods or bolts 7, 8, etc., are electrically insulated from the pipe flanges by dielectric sleeves 15, 16, etc., and dielectric washers 17, 18, 19, 20, etc., separating the flat washers or nuts from the pipe flanges. In the pipe flange joint employing the dielectric gasket 1, each section of the pipe is electrically insulated from the adjacent pipe sections connected thereto, as the dielectric gasket 1 provides a positive barrier against the galvanic and ground electric current flow across the two pipe flanges 9 and 10.

In FIG. 2 there is illustrated another cross section of the embodiment shown in FIG. 1, which cross section is taken along plane 2—2 as shown in FIG. 1. The inside diameter of the dielectric gasket 1 generally lines up with the inside diameter of the pipes, as the outside diameter 6 thereof is guided by the tie rods or bolts 7, 8, etc., in the installation of the dielectric gasket 1.

In FIG. 3 there is illustrated a portion of the cross section of the dielectric gasket 21 having the same laminated construction and seal grooves as the embodiment shown in FIG. 1. The two seal grooves 22 and 23 having a dove tail shaped cross section accomodate two spring loaded face sealing lip seals 24 and 25, respectively. The spring loaded lip seal includes a closed loop of spring having an elastic cross section, which is disposed within a closed loop of cavity of generally U-shaped cross section included in the lip seal. This closed loop of spring may be an elastomer O-ring, or a closed loop of a coil spring or a mechanical spring of a U-shaped cross section.

In FIG. 4 there is illustrated a portion of the cross section of a dielectric gasket 26 having the same laminated construction and seal grooves as the embodiment shown in FIG. 1. The dielectric gasket 26 includes a pair of O-ring seals 27 and 28 disposed in the two seal grooves having a dove tail shaped cross section, respectively.

The embodiments of the dielectric gaskets of the present invention shown in FIGS. 1, 3 and 4 provide the following advantages over the existing dielectric gaskets in the market: (1) The dielectric laminates of high elastic modulus glass reinforced epoxy are permanently bonded to the faces of the metallic base disc after the faces of the metallic base disc is roughened by sand blasting and roughening the bonded side of each of the two glass reinforced epoxy laminates. As a consequence, the entire gasket assembly behaves like a single piece disc of substantial rigidity. Due to the high elastic modulus of the glass reinforced expoxy laminates, the dielectric gasket of the present invention withstands over-compression accidentally taking place during the installation and protects the resilient ring seals under all circumstances. The roughened faces of the metallic base disc and the roughened faces of the glass reinforced epoxy laminates permanently bonded to each other prevent separation therebetween by shear, because the solid-solid interface friction resulting from the compression thereon by the pipe flanges in addition to the bonding stress between the roughened metallic surfaces and the roughened epoxy laminate surfaces bonded to each other is capable of withstanding very large shear force. The shear force increases in proportion to the thickness of the dielectric laminate. It is the use of the relatively thin glass reinforced epoxy laminate in combination with the high friction force resulting from the bonding of the two roughened hard surfaces of the metallic base disc and the hard epoxy laminates that brings forth the outstanding characteristics of the present invention and redefines the distribution of stress. A conventional gasket is vulnerable to pressure because of the reduced friction force or reduced compression at the middle of the gasket. For conventional gaskets, high tie rod or bolt torque is required to effect a positive seal. Conversely, the gasket of the present invention has its greatest friction force in the middle of the gasket as a result of the high strength bond. The shear force acting on the interface between the metallic base disc and the epoxy laminates is countered by the friction force resulting from the two roughened surfaces permanently bonded to one another. The magnitude of the shear force acting on the bonded interface of the gasket of the present invention is generally small because the thickness of the dielectric laminates bonded to the metallic base disc is small and, consequently, a sufficient amount of the friction force countering the shear force in combination with the bonding stress can be obtained without requiring a high bolt torque. The bonding of the roughened dielectric laminate surface to the roughened metallic surface of the base disc also provides added rigidity to the cross section of the dielectric laminates. What this means is that when the gasket is subjected to high bolt torques, the dielectric material then only benefits further by the added frictional force resulting from the compression provided by the pipe flanges. The real importance of this design becomes clear over time as the bolt tension and torque are relaxed due to material creep or aging or fatigue due to repeated expansion and contraction of the thermal cycles. It is then that this design over any other designs will prevent gasket failure. Overtorqueing is also a noted problem. All gasketing materials have a well defined limit beyond which the materials of the gaskets will yield and flow. Because the cross section of the dielectric material has been reduced in the present invention, the stress thereon as well as the affected cross section of the dielectric material subjected to the stress and deformation has also been reduced. This in addition to the bonding to the matallic base disc reduces the potential to flow and deform under flange compression. This effectively eliminates the vulnerability of the gasket to overtorqueing as well. Further, the two pieces of glass epoxy laminates bonded to the two faces of the metallic base disc provide double layers of the insulating barriers and, consequently, the thickness of each glass epoxy laminate can be reduced to one half of the conventional dielectric gasket employing a single dielectric disc. The face sealing lip seals provide leak proof sealing even when the tie rods or bolts joining the two flanges are not tightened sufficiently, because the rigid seal grooves successfully confine and support the lip seals independent of the pressure from the pipe flange faces. (2) The seal groove with the cross section of a dove tail shape retains the resilient ring seals more securely. The tapered edges of the seal groove cross section are better adapted to conform with the flange face, when the seal groove is pressurized by the fluid pressure in the pipe line. As a consequence, the tapered edges of the seal groove with a dove tail shaped cross section under an intimate contact with the flange face provides a gapless confinement for the ring seal, which arrangement helps to prevent the extrusion of the ring seal out of the seal groove caused by an extremely high fluid pressure. The seal groove of a dove tail shaped cross section retains the ring seal more securely, accomodates the ring seal in a better load carrying arrangement and prevents the extrusion of the ring seal under extremely high fluid pressure. (3) The dielectric laminate of high elastic modulus glass reinforced epoxy permanently bonded to the face of the metallic base disc has an yield strength of 78,000 psi, which is sufficiently high to withstand any over-compression in the flange joint, while it provides the required resiliency to allow the imprints of the grooves included in the pipe flange face. The glass reinforced epoxy laminate in combination with the resilient ring seal provides a dual barrier seal, wherein the resilient ring seal provides the primary sealing that is enhanced by the fluid pressure, while the glass reinforced epoxy laminate under a pressurized contact with the pipe flange face provides a secondary sealing that is enhanced by the compression from the pipe flange. The glass reinforced epoxy laminate bonded to the face of the metallic base disc has only a very small relaxation under moderate heating commonly experienced by the pipe line. As a consequence, the leak proof contact between the flange face and the glass reinforced epoxy laminate does not lose the intimate contact therebetween through repeated thermal cycles and provides a long lasting sealing backing up the primary sealing provided by the resilient ring seal. The aforementioned combination of the characteristics and quality makes the dielectric gasket of the present invention extremely long lasting and repeatedly reusable. (4) The resilient elastomer ring seals provide a leak proof barrier extending from the metallic face of the pipe flange to the metallic surface of the seal groove bottom, as the depth of the seal groove partially extends into the metallic base disc. Therefore, absorption of the fluid in the pipe line by the dielectric laminates by wicking through the cross section of the dielectric laminate is completely cut off at the barrier provided by the resilient ring seal and, consequently, the deterioration of the dielectric laminates by the absorption of the fluid is checked. (5) The dielectric gasket of the present invention employing face sealing lip seals provide an added insurance against leak. The sealing action of the lip seal arises from the fluid pressure in the pipe instead of the contact pressure between the seal and the pipe flange face. Even when the pipe flange coupling loses the compression between the two flange faces due to the deterioration of the dielectric washers separating the metallic washers or nuts from the pipe flanges or due to a permanent set of the dielectric laminate of the gasket, the face sealing lip seals still provide leak proof sealing when other types of gaskets relying on the direct contact pressure thereon would spring a leak. (6) The dielectric gasket of the present invention reinforced with the metallic base disc has a sufficient strength to withstand the loading exerted by the fluid pressure without relying on the frictional support provided by the faces of the pipe flanges. Therefore, it is absolutely impossible for the dielectric gasket of the present invention to be blown out by the fluid pressure and spring a catastrophic leak even when the compression between the two pipe flanges is completely gone. The aforementioned six different advantages provided by the present invention describe the novelty anad patentability thereof beyond any doubt.

In FIG. 5 there is illustrated a cross section of another embodiment of the present invention, that is a modified version of the embodiments shown in FIGS. 1, 3 and 4. The dielectric gasket 29 has the same construction as those described in conjunction with FIGS. 1, 2, 3 and 4 with one exception being that the internal and external cylindrical surfaces 30 and 31 of the dielectric gasket of the laminated construction are now lined with a layer of corrosion resisting material, which linings provide additional protection for the metallic base disc 32 from the fluid in the pipe line. Of course, the metallic surface of the metallic base disc exposed at the bottoms of the seal grooves may also be lined with corrosion resisting linings or the depth of the seal groove may be limited within the dielectric laminate rather than partially extending into the metallic base disc.

I claim:

1. A dielectric pipe flange gasket comprising in combination:
   (a) an annular disc of laminated construction including a metallic disc and a pair of dielectric linings respectively bonded to two faces of said metallic disc, and
   (b) a first ring seal disposed in a first seal groove included in one face of said annular disc in a coaxial arrangement and a second ring seal disposed in a second seal groove included in the other face of said annular disc in a coaxial arrangement, wherein said seal grooves have a dove tail shaped cross section with an opening in the cross section narrower than the bottom and depth partially extending into said metallic disc.

2. The combination as set forth in claim 1 wherein said ring seals are face sealing lip seals with a cross section including a pair of lip seals respectively in contact with the bottom of the seal groove and with the face of a pipe flange when said dielectric pipe flange gasket is installed intermediate two pipe flanges.

3. The combination as set forth in claim 2 wherein said ring seals are spring loaded lip seals, wherein said pair of lip seals are spring biased against one another by a closed loop of a spring having an elastic cross section included in the ring seal.

4. The combination as set forth in claim 1 wherein said ring seals are O-ring seals.

5. The combination as set forth in claim 1 wherein said pair of dielectric linings are high elastic modulus glass reinforced epoxy laminates permanently bonded to the two faces of said metallic disk.

6. The combination as set forth in claim 1 wherein the internal cylindrical surface of said annular disc is lined with a corrosion resisting lining.

7. The combination as set forth in claim 6 wherein the external cylindrical surface of said annular disc is lined with a corrosion resisting lining.

8. The combination as set forth in claim 1 wherein bonding of said dielectric linings to the faces of said metallic disc includes a roughened surface of the dielectric lining and roughened surface of the metallic disc bonded to one another and cured under compression therebetween.

9. The combination as set forth in claim 1 wherein said pair of dielectric linings have a hardness high enough to withstand over-compression between two pipe flanges and low enough to provide imprints of surface textures of pipe flange faces on the faces of said annular disc.

* * * * *